United States Patent
Donner et al.

(10) Patent No.: US 9,819,548 B2
(45) Date of Patent: Nov. 14, 2017

(54) SHARED INFORMATION DISTRIBUTION IN A COMPUTER NETWORK

(71) Applicant: Cisco Technology, Inc., San Jose, CA (US)

(72) Inventors: Paul Donner, San Jose, CA (US); Alexander Clemm, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 611 days.

(21) Appl. No.: 13/750,559

(22) Filed: Jan. 25, 2013

(65) Prior Publication Data

US 2014/0215028 A1  Jul. 31, 2014

(51) Int. Cl.
H04L 12/24 (2006.01)
H04L 12/751 (2013.01)
H04L 12/66 (2006.01)

(52) U.S. Cl.
CPC .......... *H04L 41/0886* (2013.01); *H04L 41/16* (2013.01); *H04L 12/66* (2013.01); *H04L 41/042* (2013.01); *H04L 41/046* (2013.01); *H04L 41/0806* (2013.01); *H04L 45/02* (2013.01)

(58) Field of Classification Search
CPC . H04L 41/12; H04L 41/0803; H04L 41/0813; H04L 41/0853; H04L 41/0869; H04L 41/0886; H04L 67/34; G06F 8/71; G06F 8/65; G06F 9/44505; G06F 15/177; G06F 11/2247
See application file for complete search history.

(56) References Cited

U.S. PATENT DOCUMENTS

| | | | | |
|---|---|---|---|---|
| 6,161,015 | A * | 12/2000 | Birchler et al. | 455/440 |
| 6,392,997 | B1 * | 5/2002 | Chen | 370/252 |
| 6,501,756 | B1 * | 12/2002 | Katsube et al. | 370/392 |
| 6,608,833 | B2 * | 8/2003 | Katsube et al. | 370/392 |
| 7,159,035 | B2 * | 1/2007 | Garcia-Luna-Aceves et al. | 709/241 |
| 7,242,678 | B2 * | 7/2007 | O'Neill et al. | 370/349 |
| 7,298,707 | B2 * | 11/2007 | Retana et al. | 370/252 |
| 7,302,704 | B1 * | 11/2007 | Elliott | 726/22 |
| 7,457,251 | B1 * | 11/2008 | Chen | 370/252 |
| 7,599,315 | B2 * | 10/2009 | Cornet et al. | 370/258 |

(Continued)

OTHER PUBLICATIONS

Lim, Distributed services for information dissemination in self-organizing sensor networks, May 1, 2001, Journal of the Franklin Institute 338 (2001) 707-727, pp. 1-21.*

(Continued)

*Primary Examiner* — Barbara B Anyan

(57) ABSTRACT

In one implementation, a protocol for dissemination of information, such as configuration information, in a computer network is provided. The dissemination of the payload or content is separated from the dissemination of the fact that a new revision of that payload or content exists. The availability of a new revision of the payload or content is signaled prior to the transfer. Only nodes receiving the notice of existence of the new revision and requesting the new revision receive the payload or content. While the payload or content revision notifications potentially arrive at a receiving node from many different neighbors, the payload or content is only requested once by the receiving node and transmitted once over links between neighbors. This scheme may result in low end-to-end delays and in resiliency.

19 Claims, 2 Drawing Sheets

(56) References Cited

U.S. PATENT DOCUMENTS

| | | | |
|---|---|---|---|
| 7,715,396 B2* | 5/2010 | Castro et al. | 370/392 |
| 7,769,902 B2* | 8/2010 | Valdevit et al. | 709/248 |
| 7,796,537 B2* | 9/2010 | White et al. | 370/254 |
| 7,821,956 B2* | 10/2010 | Retana et al. | 370/252 |
| 7,826,847 B1* | 11/2010 | Roskowski | H04W 36/0083 455/432.1 |
| 7,853,286 B2* | 12/2010 | Ryu et al. | 455/524 |
| 7,873,352 B2* | 1/2011 | Nguyen et al. | 455/411 |
| 7,940,776 B2* | 5/2011 | Retana et al. | 370/395.31 |
| 7,957,377 B1* | 6/2011 | Roy | 370/392 |
| 7,957,761 B2* | 6/2011 | Ryu et al. | 455/524 |
| 8,144,662 B2* | 3/2012 | Xing et al. | 370/331 |
| 8,199,635 B2* | 6/2012 | Taylor et al. | 370/217 |
| 8,230,056 B2* | 7/2012 | Bishop et al. | 709/223 |
| 8,254,982 B2* | 8/2012 | Kuningas | 455/525 |
| 8,310,950 B2* | 11/2012 | Lofstrand et al. | 370/252 |
| 8,315,188 B2* | 11/2012 | Valdevit et al. | 370/254 |
| 8,335,511 B2* | 12/2012 | Singh et al. | 455/445 |
| 8,391,867 B2* | 3/2013 | Kida et al. | 455/436 |
| 8,504,809 B2* | 8/2013 | Chien | 713/1 |
| 8,522,231 B2* | 8/2013 | Arcese et al. | 717/171 |
| 8,538,446 B2* | 9/2013 | Won et al. | 455/450 |
| 8,543,665 B2* | 9/2013 | Ansari et al. | 709/218 |
| 8,670,763 B1* | 3/2014 | Oroskar et al. | 455/437 |
| 8,750,100 B2* | 6/2014 | Guo et al. | 370/225 |
| 8,751,644 B2* | 6/2014 | Bornhoevd et al. | 709/224 |
| 8,818,371 B2* | 8/2014 | Watanabe | 455/435.3 |
| 8,848,515 B2* | 9/2014 | Wen et al. | 370/222 |
| 2002/0013856 A1* | 1/2002 | Garcia-Luna-Aceves et al. | 709/238 |
| 2002/0112047 A1* | 8/2002 | Kushwaha et al. | 709/223 |
| 2003/0028668 A1* | 2/2003 | Garcia-Luna-Aceves et al. | 709/238 |
| 2003/0037167 A1* | 2/2003 | Garcia-Luna-Aceves et al. | 709/238 |
| 2003/0056006 A1* | 3/2003 | Katsube et al. | 709/238 |
| 2003/0056007 A1* | 3/2003 | Katsube et al. | 709/238 |
| 2003/0208609 A1* | 11/2003 | Brusca | 709/230 |
| 2004/0024908 A1* | 2/2004 | Valdevit et al. | 709/248 |
| 2005/0081080 A1* | 4/2005 | Bender et al. | 714/2 |
| 2005/0160179 A1* | 7/2005 | Retana et al. | 709/238 |
| 2006/0039371 A1* | 2/2006 | Castro et al. | 370/389 |
| 2006/0133376 A1* | 6/2006 | Valdevit | 370/390 |
| 2006/0165025 A1* | 7/2006 | Singh et al. | 370/315 |
| 2006/0215582 A1* | 9/2006 | Castagnoli | H04L 45/02 370/254 |
| 2006/0256763 A1* | 11/2006 | Nguyen et al. | 370/338 |
| 2007/0130264 A1* | 6/2007 | Walker | H04L 41/0668 709/206 |
| 2007/0136315 A1* | 6/2007 | Choi et al. | 707/10 |
| 2007/0208832 A1* | 9/2007 | Traub et al. | 709/220 |
| 2007/0268516 A1* | 11/2007 | Bugwadia et al. | 358/1.15 |
| 2007/0294757 A1* | 12/2007 | Stephens | H04L 41/042 726/12 |
| 2008/0043635 A1* | 2/2008 | Retana et al. | 370/252 |
| 2008/0056207 A1* | 3/2008 | Eriksson et al. | 370/338 |
| 2008/0195868 A1* | 8/2008 | Asokan et al. | 713/176 |
| 2008/0201403 A1* | 8/2008 | Andersson et al. | 709/202 |
| 2008/0247379 A1* | 10/2008 | Belanger et al. | 370/351 |
| 2008/0259820 A1* | 10/2008 | White et al. | 370/255 |
| 2008/0310433 A1* | 12/2008 | Retana et al. | 370/401 |
| 2009/0137246 A1* | 5/2009 | Xing et al. | 455/434 |
| 2009/0164586 A1* | 6/2009 | Douglas | H04L 51/24 709/206 |
| 2009/0180489 A1* | 7/2009 | Fujita | H04L 12/66 370/409 |
| 2009/0271504 A1* | 10/2009 | Ginter et al. | 709/220 |
| 2009/0280811 A1* | 11/2009 | Kida et al. | 455/436 |
| 2009/0307336 A1* | 12/2009 | Hieb | 709/220 |
| 2010/0039933 A1* | 2/2010 | Taylor et al. | 370/217 |
| 2010/0125545 A1* | 5/2010 | Navas | G06F 17/30516 707/602 |
| 2010/0182936 A1* | 7/2010 | Valdevit et al. | 370/254 |
| 2011/0059744 A1* | 3/2011 | Won et al. | 455/450 |
| 2011/0093743 A1* | 4/2011 | Arcese et al. | 714/18 |
| 2011/0145383 A1* | 6/2011 | Bishop et al. | 709/223 |
| 2011/0173685 A1* | 7/2011 | Chai | H04L 41/0806 726/6 |
| 2011/0310621 A1* | 12/2011 | Van Der Stok et al. | 362/311.12 |
| 2011/0314058 A1* | 12/2011 | Motwani | 707/770 |
| 2012/0250548 A1* | 10/2012 | Swaminathan et al. | 370/252 |
| 2012/0284794 A1* | 11/2012 | Trent | G06F 21/64 726/23 |
| 2013/0044765 A1* | 2/2013 | Chen et al. | 370/401 |
| 2013/0060942 A1* | 3/2013 | Ansari et al. | 709/225 |
| 2013/0079005 A1* | 3/2013 | Watanabe | 455/435.1 |
| 2013/0128771 A1* | 5/2013 | Wen et al. | 370/254 |
| 2013/0132547 A1* | 5/2013 | Reed | 709/223 |
| 2013/0132553 A1* | 5/2013 | Stratton | H04L 41/50 709/223 |
| 2013/0145010 A1* | 6/2013 | Luna et al. | 709/223 |
| 2013/0151678 A1* | 6/2013 | Fukasawa | 709/221 |
| 2013/0183973 A1* | 7/2013 | Amerga et al. | 455/436 |
| 2013/0208583 A1* | 8/2013 | Guo et al. | 370/225 |
| 2013/0212411 A1* | 8/2013 | Nicholson | H04L 12/10 713/310 |
| 2013/0219009 A1* | 8/2013 | Bheemarajaiah | H04L 41/046 709/217 |
| 2013/0227091 A1* | 8/2013 | Tompkins | 709/220 |
| 2013/0227114 A1* | 8/2013 | Vasseur et al. | 709/224 |
| 2013/0232235 A1* | 9/2013 | Ma | 709/219 |
| 2013/0275560 A1* | 10/2013 | Bestmann et al. | 709/219 |
| 2014/0040450 A1* | 2/2014 | Sanneck et al. | 709/223 |
| 2014/0066072 A1* | 3/2014 | Carlsson | 455/436 |
| 2014/0122862 A1* | 5/2014 | Ludwig | G06F 8/65 713/100 |

OTHER PUBLICATIONS

Juvva and Rajkumar, A Real-Time Push-Pull Communications Model for Distributed Real-Time and Multimedia Systems, Jan. 1999, School of Computer Science, Carnegie Mellon University, CMU-CS-99-107, pp. 1-25.*

Autonomic networking, Mar. 15, 2013, Wikipedia, http://en.wikipedia.org/wiki/Autonomic_networking[Nov. 4, 2014 4:58:00 PM], pp. 1-8.*

U.S. Appl. No. 13/742,071, filed Jan. 15, 2013.

"IEEE 802.1X," webpage, Wikipedia, http://en.wikipedia.org/wiki/IEEE_802.1X, pp. 1-7, May 22, 2012.

"IEEE 802.1X-2004—Port Based Network Access Control," webpage, http://www.ieee802.org/1/pages/802.1x-2004.html, pp. 1-3, May 22, 2012.

"Secure Neighbor Discovery Protocol," webpage, Wikipedia, http://en.wikipedia.org/wiki/Secure_Neighbor_Discovery_Protocol, pp. 1-2, May 22, 2012.

"Neighbor Discovery for IP version 6 (IPv6)," webpage, http://tools.ietf.org/html/rfc4861, pp. 1-97, May 22, 2012.

"Cisco Discovery Protocol," webpage, Wikipedia, http://en.wikipedia.org/wiki/Cisco_Discovery_Protocol, p. 1, May 22, 2012.

"Link Layer Discovery Protocol," webpage, Wikipedia, http://en.wikipedia.org/wiki/Link_Layer_Discovery_Protocol, pp. 1-3, May 22, 2012.

"Routing Protocol Security Requirements (rpsec) (concluded WG)," webpage, http://datatracker.ietf.org/wg/rpsec/charter/, pp. 1-2, May 22, 2012.

"Neighbor Router Authentication: Overview Guidelines," webpages, Cisco IOS Security Configuration Guide, http://www.cisco.com/en/US/docs/ios/12_2/security/configuration/guide/scfroutr.html, pp. 1-5, May 22, 2012.

"The Public Key Infrastructure Approach to Security," Oracle9i Security Overview, Release 2 (9.2) Part No. A96582-01, © 2001-2002 Oracle Corporation, 8 pages; http://docs.oracle.com/cd/B10500_01/network.920/a96582/pki.htm.

Cisco Systems, Inc., "Unique Device Identifier Retrieval," © 2003-2006 Cisco Systems, Inc., 12 pages; http://www.cisco.com/en/US/docs/ios/12_3t/12_3t4/feature/guide/gtpepudi.html.

(56) References Cited

OTHER PUBLICATIONS

Cisco, "Understanding Cisco TrustSec," Revised Jun. 16, 2011, 10 pages; http://www.cisco.com/en/US/docs/switches/lan/trustsec/configuration/guide/arch_over.html.
Cooper, et al., "Internet X.509 Public Key Infrastructure Certificate and Certificate Revocation List (CRL) Profile," Network Working Group RFC 5280, May 2008, 166 pages; http://www.ietf.org/rfc/rfc5280.txt.
Interopnet Labs, "What is EAP-FAST?" InteropNet Labs Full Spectrum Security Initiative (May 2005), 1 page; http://www.opus1.com/nac/whitepapers-old/e-eapfast-lv05.pdf.
"Dynamic Host Configuration Protocol" webpage Wikipedia, http://en.wikipedia.org/wiki/Dynamic_Host_Configuration_Protocol, pp. 1-15, Jan. 23, 2013.
J. Hui et al., "Multicast Protocol for Low power and Lossy Network (MPL) draft-ietf-roll-trickle-mcast-02," webpage, Abstract, http://tools,ietf.org/html/draft-ietf-roll-trickle-mcast-02, pp. 1-24, Jan. 23, 2013.
J. Arkko et al., "Home Networking Architecture for IPv6 draft-arkko-townsley-homenet-arch-00," webpage, Abstract, http://tools.ietf.org/html/draft-arkko-townsley-homenet-arch-00, pp. 1-12, Jan. 23, 2013.

\* cited by examiner

SHARED INFORMATION DISTRIBUTION IN A COMPUTER NETWORK

TECHNICAL FIELD

This disclosure relates in general to the field of computer networks and, more particularly, to a protocol for distributing information for use by multiple devices, such as intent information, in a computer network.

BACKGROUND

Network devices are designed to interoperate with each other in networks to carry services. Networks are becoming increasingly more complex, both in terms of the diversity of hardware components as well as in the functionality of the operating systems. The increased complexity and sophisticated network management systems must be learned by human operators. From the view of a network operator, the operational expenditure to successfully run a network is increasing.

One source of increased complexity is configuration of the network and devices. When building networking infrastructure, each node is configured to communicate with other nodes and operate in specific ways. To configure each node, the configuration parameters specific to that node are pushed to the node by a centralized server. The node may alternatively pull or request configuration from the centralized server, such as is performed in the Diagnostic Host Configuration Protocol. The configuration of each device is handled individually, so this configuration information is distributed accordingly.

Other types of information may be shared by multiple devices This common or shared information may be communicated to multiple nodes in a network using flooding or broadcast mechanisms. The information is transmitted along a tree or network structure. Flooding has the drawback of being fairly wasteful, since the same information may be received at a node from multiple upstream (in terms of the dissemination direction) neighbors. For large files, flooding may be particularly wasteful. Gossip protocols, on the other hand, typically involve somewhat greater delays as information is transmitted based on some criteria. Gossip protocols may also lead to waste due to redundant transmission of the same information from multiple nodes to the same node.

BRIEF DESCRIPTION OF THE DRAWINGS

To provide a more complete understanding of the present disclosure and features and advantages of various embodiments, reference is made to the following description, taken in conjunction with the accompanying figures, wherein like reference numerals represent like parts.

DESCRIPTION OF EXAMPLE EMBODIMENTS

Figure 1:
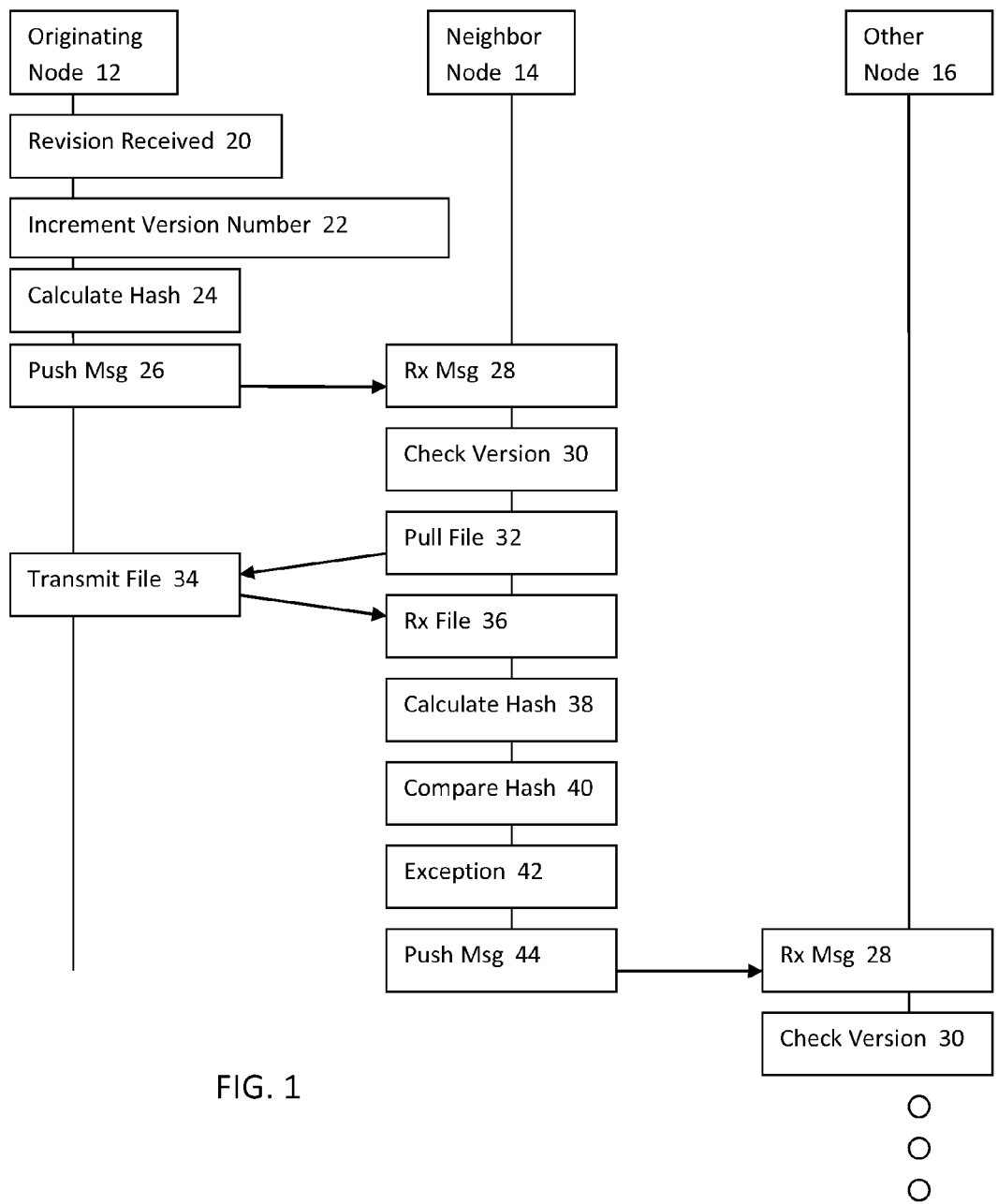
FIG. 1 is a flow chart diagram of an embodiment of a method for shared information distribution in a computer network.

A protocol for dissemination of common or shared information, such as intent information, in a computer network is provided. The dissemination of the payload or content itself is separated from the dissemination of the fact that a new revision of that payload or content exists. In other words, the availability of a new revision of the payload or content is signaled prior to the transfer. Only nodes receiving the notice of existence of the new revision and requesting the new revision receive the payload or content. The notice of existence follows a "push" model whereas the dissemination of the payload or content follows a "pull" model, providing a push/pull distribution protocol. This push/pull combination results in a protocol that is very resourceful. While the payload or content revision notifications potentially arrive at a receiving node from many different neighbors, the payload or content itself is only requested once by the receiving node and transmitted once over links between neighbors. This scheme may result in low end-to-end delays and in resiliency.

In one embodiment, the push/pull distribution protocol is used in autonomic networking. The autonomic network generates one or more adhoc networks with one or more default configurations that are accepted by the nodes of the network. The intelligence of networking is provided on the network devices. Autonomic networking relies on the components themselves, and greatly simplifies the interface to the operator and network management system. The intelligence used in the components provides the relevant best practices and keeps the network components up to date, without the need for human intervention. Other types of networks may be used.

One concept in autonomic networks is the ability of operators to configure important aspects of the network as a whole through generalized control of node configuration. A global network configuration, also termed "intent," is defined by an operator and then takes effect across all or many nodes on the network instead of requiring the operator to think about how to configure devices one at a time and risk introducing possible inconsistencies in the process. The intent information is to be shared by multiple devices and is used for configuration.

The intent or global configuration information is abstract relative to a given node. The intent may not include specific settings. The intent signifies globally applicable "directives" for how the network is supposed to configure itself and how the network is supposed to behave. Intent represents network-level, global configuration parameters that postulate operational objectives. Intent is not-node specific, but needs to be communicated across components in the network.

Each device interprets the intent and determines specific settings for configuring operation by the device from the interpretation. The devices implement the intent by translating the intent locally into a set of suitable configuration parameters, and/or by negotiating/coordinating certain settings to be aligned and complementary to those of their neighbors. The network configuration (e.g., "intent") that is not specific to an individual node but that applies to the network as a whole includes network-level abstractions that individual nodes break down to their device-specific configuration parameters. Contrary to traditional configuration in which each node is configured individually with an individual file, in autonomic networks, the network is configured as a whole using shared or common information.

The intent is to be reliably and quickly distributed to the autonomic nodes within a domain. The push/pull protocol provides an autonomous distribution method which reliably distributes intent information. In the context of autonomic networks, having to rely on a centralized component to disseminate configuration information is not a preferred option. Instead, a more decentralized option is preferred. To avoid requiring a dedicated point of entry for an operator, the push/pull protocol may be initiated by any node in the network.

While proposed as a solution for the distribution of intent for autonomic networks, the push/pull protocol may be used for other applications to disseminate information throughout a network domain (e.g., distribute the same information to multiple or all nodes) quickly and reliably with minimal impact on networking resources. Shared or common information is distributed using the push/pull protocol.

The push/pull protocol may result in the information being transmitted once and only once to each node. Since the push/pull protocol is decentralized, no single point of control, no dedicated point of entry, no need to discover the network (e.g., no need for a planned or tree of distribution), and no single point at which information is maintained or that must be known to everybody may be needed. The distribution is robust against node and link failures. The push/pull protocol may have the ability to inject new revisions from anywhere in the network, possibly concurrently from more than one location, to disseminate a new revision as quickly as possible (e.g., may find the quickest path), to disseminate without wasting bandwidth (e.g., transmit the information once, upon request, and only once, to each node), to be resilient to failures as no distribution tree or planned path is used, and to minimize the amount of overhead and state that needs to be maintained. Nodes send the revision message when ready to serve information, so the protocol is self throttling. Since broadcasting to neighbors is used from any originating node, there may not be a single bottle neck or point that needs to serve out files to everybody.

FIG. 1 shows a method for distributing information to multiple nodes in a network, such as distributing intent in an autonomic network. The distribution uses the push/pull protocol. One or more nodes transmit availability of the information to neighbors (pushes). Any neighbor without the information requests one of the nodes from which availability was indicated to provide the information (pulls). The pulling nodes then transmit availability to neighbors that did not indicate availability. This distribution continues until nodes terminate the process when the receiving node already has the information.

Figure 2:
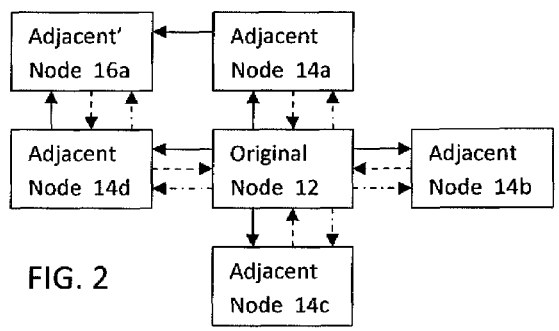
FIG. 2 is a simplified block diagram of an example computer network for distributing shared information.
Figure 3:
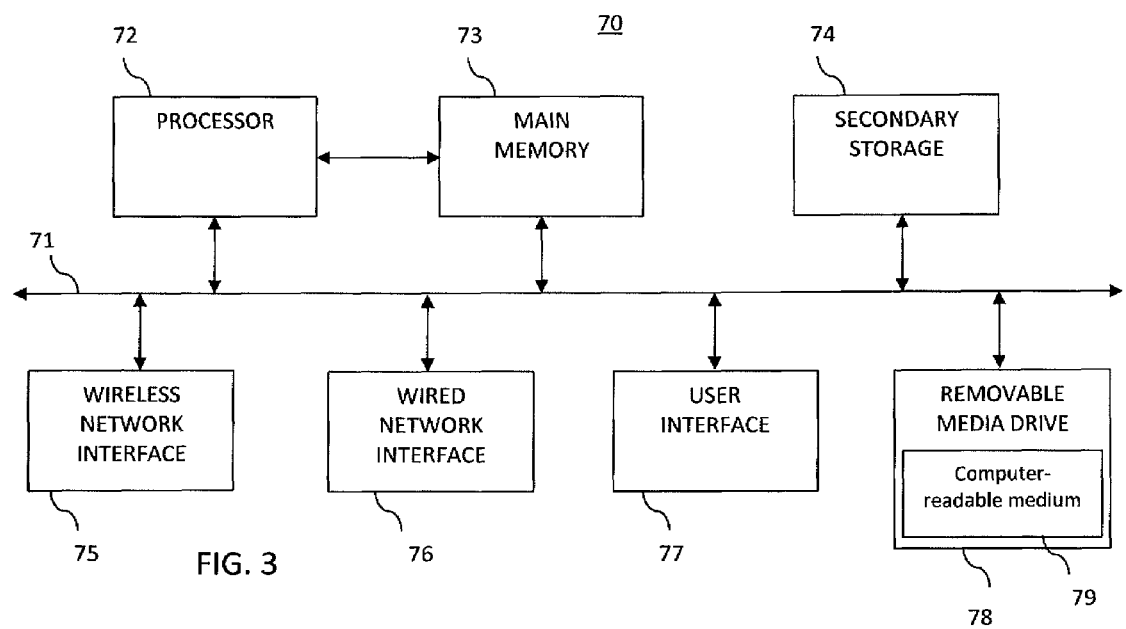
FIG. 3 is a block diagram of a network device, according to one embodiment, for use in distributing shared information in a computer network.

The method is implemented by the network devices 12, 14, 16 of FIG. 2, the network device 70 of FIG. 3, or other devices. FIG. 1 shows the acts performed by different computer network devices 12, 14, 16 to distribute information throughout the network. For example, the processor 70 of node 12 performs or participates in acts 20-26 and 34. While node 12 represents an originating node of the new information, any node 12, 14, 16 may be an originating node. Node 16 is an edge or terminating node at which the push/pull process ceases or is another intermediary node for continuing distribution.

Additional, different, or fewer acts may be provided. For example, act 22 is not provided, and manual setting of the version number is provided instead. As another example, node 14 may have already received the file or other information, so acts 32-44 of node 14 and acts 28-30 of node 16, to the extent acts 28-30 rely on the receipt of a notification from node 14 at that time, are not provided. In yet another example, nodes 12, 14, and/or 16 also perform a configuration or other operation act where the information from the distributed file is applied at the node. In other examples, additional verification, acknowledgement, exception handling, and/or processing is provided.

The acts are performed in the order shown or a different order. The order progresses from top-to-bottom through FIG. 1. The three dots under node 16 represent continuing acts, such as continuing with node 16 performing the acts 32-44.

The method is implemented on a network. The nodes 12, 14, 16 are computer network devices of a network. The protocol is network topology neutral, and maintains minimal state on actions relevant to signaling or intent propagation. The node 12 is adjacent to node 14, node 14 is adjacent to nodes 12 and 16, and node 16 is not adjacent to node 12. Adjacent is used in the context of layer 2, so adjacent nodes are directly connected nodes. In alternative embodiments, adjacent is used in a layer 3 context, so represent adjacent nodes for operational purposes.

Any type of information may be distributed through the network. For example, the information relates to configuration. Actual configuration settings for some or all of the nodes are distributed. Alternatively, intent is distributed for interpretation by the nodes to self configure in an autonomic network. Configuration information (e.g., abstracted intent or specific configuration settings themselves) may include large amounts of data. Limiting the numbers of times such large amounts of data are transmitted may avoid unnecessary bandwidth usage.

In one embodiment, the distributed information indicates a network wide intent for configurations of all or sub-sets of the various nodes. For example, the intent or other information is specific to sub-domains of the network, but may be distributed throughout. Any nodes not part of the sub-domain may merely pull the information for passing on to the sub-domain. Similarly, the information may not be needed or used by some nodes, such as intent not applying to a particular node. The node may pass on the information without using the information. Alternatively, the information is for use by every node.

In one embodiment, the information is a revision, so only a subset of the information changes as compared to a previous version. For example, an intent file or other data is revised. Part of the information is changed. In alternative embodiments, the information is entirely new, such as for an added node that does not yet store an intent file.

The format of the information is a file, database, document (e.g., xml document), or other. The information may be a replacement, such as providing the new version of all of an intent file. Alternatively, the information is a delta representing the changed information without including at least some of the information not being changed. For example, the changes from one version to the next are provided. The nodes receiving the delta information use the formatting and/or coding of the information. For example, in one variation, a node that announces an intent revision may announce in a flag the format in which the revision is available—as a delta, a complete file, or both. A node that pulls the intent may likewise announce in a flag what to pull—the delta or the complete file.

In one embodiment, new configuration information is distributed as an intent file or data in an autonomic network. Any communications structure may be used for the distribution. For example, the operations, administration, and management (OAM) network is used. As another example, a control plane, such as the autonomic control plane disclosed in U.S. Published patent application Ser. No. _____ (Ser. No. 12/742,071), is used. The control plane provides a communications overlay within the autonomic network. The establishment of communication channels between neighboring nodes, security, discovery of neighbors, bootstrapping, and other operations are provided by the control plane overlay.

In act 20, information to be distributed originates on a node 12. The originating node 12 is the node from which the information begins distribution to the remainder of the network. In an autonomic network, the originating node may be any or any of a group of nodes. Using any node may be robust to link or node failures and allow an administrator to inject changes from various locations. Where there is a risk of multiple changes, the nodes for originating the information may be limited so that consistent injection points are used. For a more centralized network, the information may originate at a central or administrative node.

The information is downloaded, transferred to, obtained from memory, created, or otherwise received at the node 12. For example, an administrator signs onto the originating node 12 and edits an intent file or other configuration information, creating new configuration information at the originating node 12.

In act 22, a version number is incremented. Where the user makes a change or changes, a revision occurs. The version number is incremented to track versions. The payload or content of the information is associated with a revision number. For example, the administrator revises an intent file, so the version number of the corresponding intent file is incremented (e.g., version 2.3 to version 2.4).

In one embodiment, the originating node 12 automatically increments the version number. In response to a user activating distribution and/or completing revision, the originating node 12 changes the version number associated with the new information. For example, the node determines the new revision number of the intent file by incrementing the current intent revision by a predetermined amount. There is no need for administrator to maintain the version number. Each node that may originate includes code for version incrementing. In alternative embodiments, the administrator supplies the version number and/or the amount of increase.

In act 24, the originating node 12 calculates a hash of the information. For example, a hash of the revised intent file is determined. Any hash calculation function may be used.

In act 26, the originating node 12 generates and transmits a message. The message indicates availability of the information to be distributed from the originating node 12. For example, the originating node 12 pushes a message indicating availability of new configuration information (e.g., the intent file). The message does not solicit confirmation or acknowledgement, but may.

The message is an advertisement of the revision or availability of the information. The message does not provide the information. The message may be in any format. For example, the message includes the version number, the hash information for integrity checking, the first origin of the available information (e.g., originating node identification), a time to take effect, other identification (e.g., administrator assigned identification), and an identification of the creator of the message (e.g., computer node 14 may pass on the same message to node 16, so node 14 is identified instead of node 12 for the subsequent message as the message creator). Other formats with additional, different, or less information may be used.

The message is transmitted to the neighbors of the original node. For example, FIG. 2 shows transmission of the message from the originating node 12 to the adjacent or neighbor nodes 14a-d. This transmission is represented by the solid arrows. The originating node 12 broadcasts or floods neighboring nodes 14 with an intent revision message, for example. The availability of the information is pushed to the neighbor devices.

In act 28 of FIG. 1, the neighboring nodes, such as the neighboring node 14, receives the revision message from the originating node 12 (e.g., from the adjacent node 12). The broadcast message pushed to the neighboring devices is received by all the neighboring devices. FIG. 1 represents one of the neighboring devices 14 receiving the message. The other devices perform the same or similar acts, including receipt. Less than all of the neighboring devices may receive the message.

The received message includes the hash and version number of the information. The hash is used to verify integrity if the information is pulled from the originator of the received message. The version number is used to determine a reaction to the message or whether to pull the information. The hash and version number may be used for conflict resolution.

In act 30, the version number is checked. For example, if a node receives an intent revision message with a version value that the node already knows about (e.g. the version number from the message is less than or equal a currently instantiated version), the message is in effect ignored. The information is not propagated further by this specific node since propagation already occurred, and no intent file is requested since the information is already known.

If the current version on the neighboring node 14 has the same version number as in the message, then the neighboring node 14 already has a copy of the information or another version with the same version number is being propagated through the network from a different source. In both cases, the neighboring node 14 terminates the distribution relative to the neighboring node 14. The neighboring node 14 does not act further to pull the information or distribute messages indicating availability of the information. This terminates the continuing distribution at least from this one neighboring node 14. Other neighboring nodes 14 act independently. For example, any node 14 that already participated in the distribution of the specific revision of configuration information does not repeat the process for that version.

Other acts may be performed. For example, multiple concurrent injections of new versions may occur within the distribution time throughout the network. In the example of FIG. 2, nodes 12 and 16, for example, both originate version changes and corresponding distribution. The revisions may be different, such as two different administrators making changes to intent for their own purposes at the same or similar times. At some point, the distribution conflicts. In the mean time, some nodes may have obtained one version of the information with the same version number. Other nodes may have obtained the other version of the information with the same version number.

For the initial conflict, a given node receives messages from two or more neighbors with the same version number. To detect this situation, the hash information in the broadcast messages is checked. The hash values in the messages are compared rather than of the received file itself. If the hash information is different, then different versions with the same number are being distributed. An exception may be noted and communicated to one or more administrators to remedy the conflict.

In this conflict, the messages are then ignored, and the existing information is maintained by the node. This occurs for each node detecting the conflict. In another embodiment, the conflict is resolved automatically. For example, the conflict is detected using the hash information. The node 12, 14, 16 applies a tie-breaker, such as selecting the information (e.g., version) from one of the possible sources of information (e.g., originating node) based on some criteria (e.g., lowest value of the originating node identification). Other criteria may use the hash information. The lowest or highest hash value determines which information to distribute. Rather than terminating distribution, any node detecting a conflict continues in the distribution process of the selected information and ceases distribution of the non-selected information. One of the revisions is then propagated through the network and the other version is not or is replaced where all the nodes apply the same criteria (e.g., lowest hash value). This conflict resolution may be flagged for administrators to deal with the non-propagated changes. The administrators may resolve their conflicts before propagating a new revision.

If the same information originates from multiple nodes in the network simultaneously, the push/pull protocol operates appropriately. No conflict occurs. An administrator may inject the information at multiple nodes to speed propagation. The propagation may lead to multiple neighbors advertising the information to a given node. If the same information is being provided, the hash values in the messages will be equal. The receiving node will select one source where messages are received from multiple sources and pull the information. For example, FIG. 2 shows the adjacent node 16a receiving messages (solid arrows) from adjacent nodes 14a and 14d. The adjacent node 16a selects to pull the information from adjacent node 14d and not node 14a, as represented by the dashed and dot-dashed arrows being between adjacent nodes 16a and 14d and not adjacent nodes 16a and 14a.

Similarly, if the information is revised again before the previous revision has completed propagating, the newest revision will propagate as normal. In some cases, a node with an old version (e.g., version 1.2) may receive messages from different neighbors about a less old version (e.g., version 1.3) and a most recent version (e.g., version 1.4). The node selects the most recent version (e.g., version 1.4) or may sequentially select both such as where the information are provided in delta files.

In act 32, the neighboring node 14 pulls the information. For example, the intent file or other revised configuration information is pulled from the originating node 12 by the neighboring node 14. The pulling is in response to the broadcast message. Where the current version number at the neighboring node 14 is less than the advertised version, the neighboring node 14 acquires the information from the advertising node (e.g., the originating node 12). In FIG. 2, the pulling is represented by the request (dashed arrow) and the response (dot-dash arrow).

The same message may be received from multiple sources. In the example of FIG. 2, the node 16 may receive a message of availability from nodes 14a and 14d. The receiving node may select one of the multiple sources for pulling to minimize bandwidth usage. The version is pulled only once for a given node. By having the neighbor node request or pull, the neighbor node may control the number of times to receive the same information.

The pulling allows the operation to be stateless. All that a node requires is the information and the version number. The state of which neighbors already advertised a given intent revision and don't need to receive a message of availability is merely an optimization that is not required.

To pull the information, the neighbor node 14 requests the information from the selected advertising node. In the example of FIG. 1, the advertising node is the originating node 12. The various neighbor devices having received the message from a given device may request the information, if no conflict is detected and the information has not already been received.

The request is for retrieving the information, such as retrieving an intent file. When a node receives a revision message with a new version number, the node requests the information from one of the nodes that sent the message with the same version number and hash number (e.g., the first node from which the revision message was received). Since a neighbor-based propagation is used, the node requests the information from the neighbor.

The pushing notification and pulling of the information as needed is self throttling. The process repeats. Any node that pulls the information, then broadcasts to other neighbors. The broadcast of availability occurs as any given node is able. Individual nodes only take on the load that they can handle and have only to distribute limited copies of the information, depending on the number of neighbors. In the case of constant intent file updates, a node will only request the latest update when it is ready to process the latest update. The node will not announce availability of the new information to neighbors until the node is ready to do so (i.e. until the node has that file and is ready to serve requests for that file). The node controls the propagation of messages and may only honor retrieval requests from those neighbors to which the node propagated the message. Since many or all nodes participate, single points of bottlenecks are avoided. In alternative embodiments, a limited number of nodes may serve as distribution points of the actual information.

In act 34 of FIG. 1, the originating node 12 (or other sender of the message) responds to the request by transmitting the information. For example, the revised intent file is sent to any of the neighboring devices 14 that request the file. The new configuration or other information is forwarded to the requesting neighbor device 14 or devices 14. Any node that receives the request for the information, forwards the information with the revision number to the requesting node.

In act 36, the requesting node (e.g., neighboring node 14) receives the requested file. In response to the request, the information is received. The information is received before the requesting node advertises availability of the information to its neighbors.

In act 38, the neighbor node 14 (i.e., the node receiving the information) calculates a hash of the received information. The same type of hash calculation as performed by the originating node 12 of the revision is used. After pulling the file, the receiving node calculates the hash for the received file.

In act 40, the calculated hash is checked against the hash of the broadcast message. Upon receipt, the information is checked for integrity. The source of the hash in the broadcast message is the node at which the information was created or originated. Once the requesting node receives the information, the receiving node checks whether the hash from the earlier availability message matches the actual content. If the hashes are the same, the node 14 propagates the message in act 44 to the neighbors (e.g., node 16) of that neighboring node 14.

If the hashes are different, exception processing occurs in act 42. Some exception handling (e.g., colliding revisions) is performed as part of receiving the message, such as checking for version number conflicts with the message hash information. These exceptions may be performed after pulling in other embodiments.

Other error handling is performed after pulling. For example, the information may be requested again as an error in transmission or pulling may have occurred. A notice may be provided to an administrator of the error. The receiving node may terminate the propagation by that node in response to an error.

In act 44, the neighbor node 14 generates a message of availability of the received information. The neighbor node 14 acts as the originating node relative to the continued dissemination of the information. The message still identifies the actual originating node of the information, but may also identify the neighbor node 14 as the node with availability of the information. The format and content of the message is as discussed above for act 26, except a different node is indicated as the sender of the message. Additional information may be changed.

The message is broadcast to the neighbors of the neighbor node 14. The broadcast may be limited. For example, the message may be pushed only to neighbors that have not advertised themselves as having the information. For example, the message is not broadcast to the originating node 12, but is broadcast to the further neighbor node 16. Where the neighbor node 14 shares neighbors with the originating node 12, the shared neighbors may have advertised availability, so are not sent the message. In alternative embodiments, the message is broadcast to neighbors regardless of whether the neighbors transmitted messages of availability.

By each node that receives the information then advertising the availability of the information, propagation continues until all nodes receive the message. With the exception of the node from which the information was received as well as any other neighbors that in the meantime advertised the same version number and hash number (e.g., those nodes already have the information), the cycle repeats. The message is created and broadcast from a spreading group of nodes to their neighbors, then the neighbors broadcast to their neighbors after pulling the information, and so on.

The node 16 performing acts 28 and 30 is an example representation of the repetition of the cycle. For each subsequent node, the information may be pulled from an advertising or message pushing neighbor. The information is pulled in response to a message of new information. The new information is pulled. After then advertising availability to other neighbors, the node may transmit the information in response to requests.

The push/pull protocol handles lost, new, or reoccurring nodes. Where a node is taken down for maintenance, replaced, restarted, recovered, added, or otherwise newly connected, any distributed information is to be provided to the node. The added node either requests the information or a message of availability of the information. Alternatively, the neighbor node, upon detecting the added node, sends a message to the added node. The added node then pulls the information, if needed (i.e., if new version).

When a node is removed, the node is no longer a neighbor. The distribution continues. Where the removal is known, distribution to the removed node is not even attempted.

The information is provided to added nodes with minimal overhead. A stored state of different nodes and/or connections between nodes is not needed. Each node reacts to a new neighbor without requiring communication of state to a centralized location.

Once obtained, the distributed information is used by the nodes. Where the distributed information is configuration information, the nodes use the information to configure themselves. For example, one or more settings for operating are changed based on the configuration information. The pulled information is used to configure the node. If the information is not appropriate for the node, the information may not be used.

In one embodiment, the distributed information is intent information. The receiving nodes interpret the intent. For example, the intent indicates optimization for speed of audio communications. A node implementing routing may assign priority to packets of audio communications relative to video or other data communications. A node implementing audio data processing may use a faster, but less refined audio coding algorithm. The same intent is used to determine different settings of the same or different variable or process.

Any of the nodes may generate information for administrators. For example, a report may be run from the node to indicate the current version being implemented by the node. Inventory or other stats may be gathered using the push/pull protocol.

FIG. 2 shows an example autonomic network for distributing information. The nodes 12, 14, 16 are network devices each operating with an autonomic process. In one embodiment, the network includes tens, hundreds, thousands or more of the network devices. "Network device" is meant to encompass any computing device or network element such as servers, routers, personal computers, mobile network elements, network appliances, switches, bridges, gateways, processors, load balancers, wireless LAN controllers, firewalls, management station, or any other suitable device, component, element, or object operable to affect or process electronic information in a network environment.

The network may be for a single domain (e.g., cisco.com) or multiple domains (e.g., cisco.com and lsk-iplaw.com). For example, the network may be a wide area network, local area network, intranet, extranet, wireless local area network, virtual local area network, or combinations of networks for one or more companies. Any form of network may be provided, such as transport networks, enterprise, data center, or other wired or wireless network. The network may be applicable across platforms, extensible, and/or adaptive to specific platform and/or technology requirements through link-negotiation of connectivity.

The network may be relatively static, such as the same network devices being provided over minutes, days, weeks, or years. Network devices may be occasionally added or replaced. In other embodiments, the network is dynamic, such as allowing network devices to be added or removed frequently. For example, mobile network elements may connect or disconnect from the network throughout a day.

The network devices are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

For communicating with each other, the network devices perform neighbor discovery. Neighbors include direct neighbors, such as network devices connected together by one hop or a single link. Neighbors may include indirect neighbors, such as network devices connected together by more than one hop or over multiple links with one or more intervening network devices. The neighbors may be neighbors either on layer 2 (link layer) or on layer 3 (network layer).

In one embodiment, neighbor discovery is performed by each of the network devices. Each device transmits neighbor discovery packets. For example, each network device broadcasts neighbor discovery packets periodically. The network devices, receiving the packets, may perform neighbor discovery for themselves. Each network device determines its own neighbors from the packets transmitted from the neighbors.

The network devices form the control plane with the discovered neighbors. The control plane is automatically formed from secured tunnels. The control plane allows for OAM functions from an administrator for the network. To ease administration of the network, the control plane is maintained despite configuration by the administrator. The administrator is prevented from making any changes to the automatically created control plane. Other virtual or actual networks may be used for the OAM function.

Autonomic networking is a fundamentally de-centralized approach. An autonomic device has default behavior in the absence of central control. For example, in the absence of global IP address information, the autonomic process picks appropriate private address ranges to allow the network to at least work locally. The network may rely on central or dedicated resources for network management, authentication, authorization, accounting (AAA) services, a certification authority and/or domain name system services.

The network management applications may be used to alter the pre-defined default behavior. Such dependencies are minimized where possible and not needed to create and operate the network. If the central resource is not available, the autonomic device has a fallback behavior defined that explains how to react in a constructive way.

To distribute control information, such as intent, a non-centralized distribution mechanism is desired for an autonomic network. The push/pull protocol is used for distribution of configuration or other information.

FIG. 3 is a simplified block diagram of an example network device (e.g. node 12, 14, 16), such as a general or special purpose computer. The example network apparatus or device 70 corresponds to network elements or computing devices that may be deployed in the network. The network device 70 includes software and/or hardware to perform any one or more of the activities or operations for creating and/or distributing information.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices. For example, the network device 70 may include another processor and/or not include the secondary storage 74 or removable media drive 78. Each network device (e.g., nodes) may include more or less components than other network devices.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any nonvolatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices 14 via one or more networks. In one example, the wireless network interface 75 includes a wireless network controller (WNIC) with suitable transmitting and receiving components, such as transceivers, for wirelessly communicating within the network. The wired network interface 76 may enable the network device 70 to physically connect to the network by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

One or more of the memories 73, 74, 79, or another memory stores file configuration information. A file or document used for or representing a configuration is stored. For example, an intent file is stored. The same intent file may be used by many or all of the network devices 70, so may be stored at each.

Other information may also be stored. For example, a version number for the information is also stored. When implementing the distribution protocol, the hash information is stored.

The processor 72 is configured to process a message about available information from a neighboring device. The communication indicates a revision to a file. If appropriate (e.g., no hash conflict with other messages and a higher version number), the processor 72 pulls the information, such as a file, in response to the received communication. To verify integrity, the hash of the acquired file is determined and compared to a hash given in the message. If the hash information is the same, the file is used (e.g., the processor 72 interprets the file and operates accordingly).

The processor 72 also generates messages for neighboring devices to continue the propagation of the file. Revision information is disseminated to neighboring devices. The dissemination may be limited, such as disseminating the message only to neighbors that have not indicated availability of the same information. The message is sent to only a sub-set of the adjacent nodes, but may be sent to all adjacent nodes.

The processor 72 is configured to terminate the dissemination, at least locally. When the version number in the message is the same or an earlier version, the file is not pulled and the availability message is not generated.

Where dissemination continues, the processor 72 transmits the file in response to requests from neighbors. In response to a message sent by the processor 72, one or more neighbor devices may request a copy of the file. The processor 72 serves the file to the neighbor devices in response to the request. Various exception handling may be performed by the processor 72.

The processor 72 also uses the file for operating. The contents or payload of the file are used to control or used during operation by the processor 72. For example, the file includes intent. The processor 72 interprets the intent and configures itself to operate in a way appropriate for the intent. The configuration information is used to configure operation of the processor 72.

The processor 72 is configured to originate changes to the file. Using a user interface, edits are made or a change is received. The processor 72 automatically increments a version number associated with the change. The push/pull protocol is then implemented by the processor 72 to begin dissemination.

The processor 72 also performs functions of the data network, such as routing or serving information. Using a separate or the same virtualization of the network, the processor 72 and the corresponding network device operate the general network for the intended purpose. This general network and corresponding network devices, including the processor 72, may be configured for operation based on the disseminated file. The general network and/or the configuration network are autonomically operated.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
    pushing, by a computer network device, a first message of availability of new configuration information to first neighboring devices, wherein the first message of availability of new configuration information includes a version number of the new configuration information and a first hash of the new configuration information, the new configuration information being a new configuration file for configuring the first neighboring devices, second neighboring devices, and an added device;
    checking, by the first neighboring devices in response to the first message, the version number of the new configuration information;
    pulling, by the first neighboring devices in response to the first message, the new configuration file containing the new configuration information when the first neighboring devices have configuration information with a different version number than the version number of the new configuration information;
    pushing a second message from the first neighboring devices that pulled the new configuration information to the second neighboring devices of the first neighboring devices other than the computer network device, the second message indicating availability of new configuration information for configuring the second neighboring devices, wherein the second message of availability of new configuration information includes the version number of the new configuration information and the first hash of the new configuration information;
    failing, by the first neighbor devices, to perform the pulling of the new configuration information and pushing the second message when the first neighboring devices have the new configuration information prior to receiving the first message;
    pulling, by the second neighboring devices in response to the second message, the file containing the new configuration information when the second neighboring devices do not have the new configuration information;
    pushing, by one of the second neighboring devices to the added device in response to discovery of the added device, a third message of availability of the new configuration information for the added device, wherein the third message of availability of new configuration information includes the version number of the new configuration information and the first hash of the new configuration information; and
    pulling the file containing the new configuration information by the added device from the one of the second neighboring devices in response to the third message.

2. The method of claim 1 wherein pushing the first and second messages comprises broadcasting the first and second messages, respectively, and wherein pulling in response to the first and second messages comprises requesting by the first and second neighboring devices.

3. The method of claim 1 further comprising:
calculating a second hash of the new configuration information after pulling; and
checking the first hash against the second hash after pulling.

4. The method of claim 1 wherein failing comprises failing when the version number matches a current version.

5. The method of claim 1 wherein pushing and pulling comprise distributing the new configuration information as an intent file in an autonomic network.

6. The method of claim 1 wherein failing comprises terminating distribution of the new configuration information at nodes which have already participated in distribution of the new configuration information, and wherein the pushing is performed only to ones of the first and second neighboring devices which have not themselves already pushed the availability of the new configuration information.

7. The method of claim 1 further comprising:
at the first and second neighboring devices that perform the pulling, configuring operation based on the pulled new configuration information.

8. The method of claim 1 wherein the computer network device comprises an originating node of the new configuration information, a user inputting the new configuration information;
further comprising automatically incrementing, by the computer network device, a version number of a file, the new configuration information being in the file.

9. The method of claim 1 wherein pulling by the first and second neighboring devices comprises requesting transmittal of the new configuration information;
further comprising:
forwarding the new configuration information by the computer network device to the first neighboring devices in response to the requesting by the first neighboring devices; and
forwarding the new configuration information by the first neighboring devices to the second neighboring devices in response to the requesting by the second neighboring devices.

10. Logic encoded in one or more non-transitory computer-readable media that includes code for execution and when executed by a processor is operable to perform operations comprising:
receiving, at a computer node of a network, a first revision message indicating availability of new configuration information for configuring a node in the network from a first adjacent node in the network, wherein the first revision message includes a version number for the new configuration information and a hash of a file;
requesting, by the computer node and from the first adjacent node, a file in response to the first revision message;
flooding adjacent nodes to the computer node, other than the first adjacent node, with a second revision message indicating availability of the new configuration information for configuring the node in the network, wherein the second revision message includes the version number for the new configuration information and the hash of the file;
transmitting, by the computer node of the network, the file to the adjacent nodes in response to a request responsive to the second revision message and from the adjacent nodes; and
transmitting, by one of the adjacent nodes, the file to an added node in the network in response to the discovery of the added node in the network.

11. The logic of claim 10 wherein the first revision message comprises a message for configuration revision appropriate for the computer node, the first adjacent node, and the other adjacent nodes, and wherein requesting the file comprises requesting a configuration file.

12. The logic of claim 11 wherein the network comprises an autonomic network, and wherein the file comprises an intent file indicating a network wide intent for configuration of the computer node, the first adjacent node, and the other adjacent nodes;
further comprising:
configuring, by the computer node, the computer node to operate based on the intent file.

13. The logic of claim 10 further comprising:
receiving the file in response to the requesting and prior to the flooding;
calculating a second hash of the file; and
confirming that the first and second hashes are equal and that the version number is greater than a current version at the computer node.

14. The logic of claim 10 wherein flooding is limited to the adjacent nodes from which revision messages are not received.

15. An apparatus comprising:
a memory operable to store a file of shared information about configuring a network node, wherein the file has a version number for the shared information; and
a processor configured to pull the file in response to a received communication about a revision to the file, wherein the received communication includes the version number for the shared information, to disseminate revision information about the revision, to transmit the file based on a request in response to the dissemination of the revision information, and to transmit the file in response to the discovery of an added node of a network to which the processor belongs.

16. The apparatus of claim 15 wherein the processor is configured to configure operation by the processor as a function of the shared information, and wherein the shared information is useable by other processors of the network for configuration of operation.

17. The apparatus of claim 15 wherein the processor is configured to calculate a first hash of the file and compare the first hash to a second hash received in the received communication.

18. The apparatus of claim 15 wherein the processor is configured to not pull and not disseminate when the received communication indicates the version number is equal to or less than a current version of the file.

19. The apparatus of claim 15 wherein the processor is configured to limit the dissemination to only a sub-set of adjacent nodes of the network, the dissemination not provided to the adjacent nodes from which communications, including the received communication, indicate the revision.

* * * * *